(12) United States Patent
Xu et al.

(10) Patent No.: US 10,475,035 B2
(45) Date of Patent: Nov. 12, 2019

(54) METHODS, SYSTEMS, AND COMPUTER READABLE MEDIA FOR CONSOLIDATED REGISTRATION OF PAYMENT CARDS

(71) Applicant: MasterCard International Incorporated, Purchase, NY (US)

(72) Inventors: Wei Xu, Millwood, NY (US); Frank Charles Barbuto, New Rochelle, NY (US)

(73) Assignee: Mastercard International Incorporated, Purchase, NY (US)

( * ) Notice: Subject to any disclaimer, the term of this patent is extended or adjusted under 35 U.S.C. 154(b) by 344 days.

(21) Appl. No.: 15/291,037

(22) Filed: Oct. 11, 2016

(65) Prior Publication Data

US 2018/0101840 A1    Apr. 12, 2018

(51) Int. Cl.
*G06Q 20/40* (2012.01)
*G06Q 20/32* (2012.01)
*G06Q 20/06* (2012.01)
*G06Q 20/08* (2012.01)
*G06Q 20/36* (2012.01)

(52) U.S. Cl.
CPC ......... *G06Q 20/4016* (2013.01); *G06Q 20/06* (2013.01); *G06Q 20/085* (2013.01); *G06Q 20/322* (2013.01); *G06Q 20/3224* (2013.01); *G06Q 20/36* (2013.01); *G06Q 20/363* (2013.01); *G06Q 20/405* (2013.01)

(58) Field of Classification Search
CPC .... G06Q 20/36; G06Q 20/322; G06Q 20/085; G06Q 20/06; G06Q 20/363
See application file for complete search history.

(56) References Cited

U.S. PATENT DOCUMENTS

| 5,987,438 | A | * | 11/1999 | Nakano | G06K 7/0013 235/375 |
| 6,085,976 | A | * | 7/2000 | Sehr | G06Q 10/02 235/380 |
| 6,636,833 | B1 | * | 10/2003 | Flitcroft | G06Q 20/00 235/380 |
| 7,578,438 | B2 | * | 8/2009 | Hogg | G06Q 20/04 235/380 |
| 7,806,323 | B2 | * | 10/2010 | Fomitchev | G06Q 20/04 235/380 |
| 8,090,351 | B2 | * | 1/2012 | Klein | G07C 13/00 455/411 |
| 8,577,803 | B2 | * | 11/2013 | Chatterjee | G06Q 20/36 705/41 |

(Continued)

*Primary Examiner* — Peter Ludwig
(74) *Attorney, Agent, or Firm* — Jenkins, Wilson, Taylor & Hunt P.A.

(57) ABSTRACT

The subject matter described herein relates to methods, systems, and computer readable media for consolidated registration of payment cards. In some examples, a method includes receiving data specifying a geographic location and one or more dates of travel to a geographic location for a user. The method includes registering, with a fraud detection engine executing on a computer system, digital payment cards for the user and the dates of travel to the geographic location. The registration causes the fraud detection engine to modify a risk score of at least a first transaction initiated by the user during the dates of travel and within a threshold geographic distance of the geographic location.

17 Claims, 5 Drawing Sheets

(56) References Cited

U.S. PATENT DOCUMENTS

| | | | | |
|---|---|---|---|---|
| 8,639,621 B1* | 1/2014 | Ellis | G06Q 30/0255 | |
| | | | 705/41 | |
| 8,793,188 B2* | 7/2014 | Larkin | G06Q 20/20 | |
| | | | 705/44 | |
| 9,721,250 B2* | 8/2017 | Hammad | G06Q 10/087 | |
| 2001/0021927 A1* | 9/2001 | Laurent | G06Q 20/06 | |
| | | | 705/65 | |
| 2001/0027441 A1 | 10/2001 | Wankmueller | | |
| 2007/0125838 A1* | 6/2007 | Law | G06Q 20/04 | |
| | | | 235/379 | |
| 2008/0162346 A1* | 7/2008 | Aaron | G06Q 20/24 | |
| | | | 705/44 | |
| 2008/0195499 A1* | 8/2008 | Meredith | G06Q 20/06 | |
| | | | 705/26.3 | |
| 2008/0222038 A1* | 9/2008 | Eden | G06Q 20/04 | |
| | | | 705/44 | |
| 2009/0037326 A1* | 2/2009 | Chitti | G06Q 20/10 | |
| | | | 705/39 | |
| 2009/0173783 A1* | 7/2009 | Fomitchev | G06Q 20/04 | |
| | | | 235/380 | |
| 2009/0327134 A1* | 12/2009 | Carlson | G06Q 20/04 | |
| | | | 705/44 | |
| 2010/0023455 A1* | 1/2010 | Dispensa | G06Q 10/02 | |
| | | | 705/44 | |
| 2011/0047075 A1* | 2/2011 | Fourez | G06Q 20/32 | |
| | | | 705/44 | |
| 2012/0011063 A1* | 1/2012 | Killian | G06Q 20/105 | |
| | | | 705/41 | |
| 2013/0054470 A1* | 2/2013 | Campos | G06Q 20/36 | |
| | | | 705/67 | |
| 2014/0122336 A1* | 5/2014 | Rich | G06Q 20/34 | |
| | | | 705/44 | |
| 2014/0279494 A1* | 9/2014 | Wiesman | G06Q 20/3224 | |
| | | | 705/44 | |
| 2014/0279641 A1* | 9/2014 | Singh | G06Q 50/265 | |
| | | | 705/325 | |
| 2016/0148332 A1* | 5/2016 | Stibel | G06Q 20/4016 | |
| | | | 705/44 | |
| 2017/0357971 A1* | 12/2017 | Pitz | G06Q 20/401 | |
| 2017/0357977 A1* | 12/2017 | Pitz | G06Q 20/202 | |

* cited by examiner his specification relates to methods, systems, and computer readable media for consolidated registration of payment cards.

METHODS, SYSTEMS, AND COMPUTER READABLE MEDIA FOR CONSOLIDATED REGISTRATION OF PAYMENT CARDS

TECHNICAL FIELD

The subject matter described herein relates generally to computer systems for consolidated registration of payment cards. More particularly, the subject matter described herein relates to methods, systems, and computer readable media for registering digital payment cards in a digital wallet with a fraud detection engine executing on a computer system.

BACKGROUND

Payment network and bank computer systems are typically configured to analyze transactions for fraud in the use of payment cards. Payment card fraud can be, e.g., counterfeit fraud, which involves counterfeit payment cards being used fraudulently at ATMs and point-of-sale (POS) devices, often in a foreign country relative to the cardholder's home country. To address this problem, some bank computer systems are programmed to sometimes deny transactions from countries where such fraud is common unless the cardholder alerts the payment card issuer of his travels to that country. For instance, when a cardholder travels to a country where counterfeit fraud is currently a problem, the bank computer system may deny the cardholder's transactions with a payment card unless the cardholder previously registered the payment card for travel with the bank computer system. Registering payment cards can be technically challenging where multiple computer systems are involved. Registering payment cards can also be inconvenient to users.

In light of these difficulties, there exists a need for methods, systems, and computer readable media for consolidated registration of payment cards.

SUMMARY

The subject matter described herein relates to methods, systems, and computer readable media for consolidated registration of payment cards. In some examples, a method includes receiving, by a travel registration manager implemented on at least one processor, data specifying a geographic location and one or more dates of travel to the geographic location for the user. The method includes receiving, by the travel registration manager, a selection of a plurality of digital payment cards from a first digital wallet for a user. The method includes registering, by the travel registration manager and with a fraud detection engine executing on a computer system, the plurality of digital payment cards for the user and the dates of travel to the geographic location, thereby causing the fraud detection engine to modify a risk score of at least a first transaction initiated by the user during the dates of travel and within a threshold geographic distance of the geographic location. In addition, the mobile devices (e.g., phone or smart watch) associated with the digital cards can be registered in the travel registration database. At the time of the payment, the location of the consumer may be verified either through the capability of the mobile payment application or phone. In the former case, the transaction is also authenticated, giving a better fraud score.

The subject matter described in this specification may be implemented in hardware, software, firmware, or combinations of hardware, software and/or firmware. In some examples, the subject matter described in this specification may be implemented using a non-transitory computer readable medium storing computer executable instructions that when executed by one or more processors of a computer cause the computer to perform operations. Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described in this specification may be located on a single device or computing platform or may be distributed across multiple devices or computing platforms.

DETAILED DESCRIPTION

Figure 1:
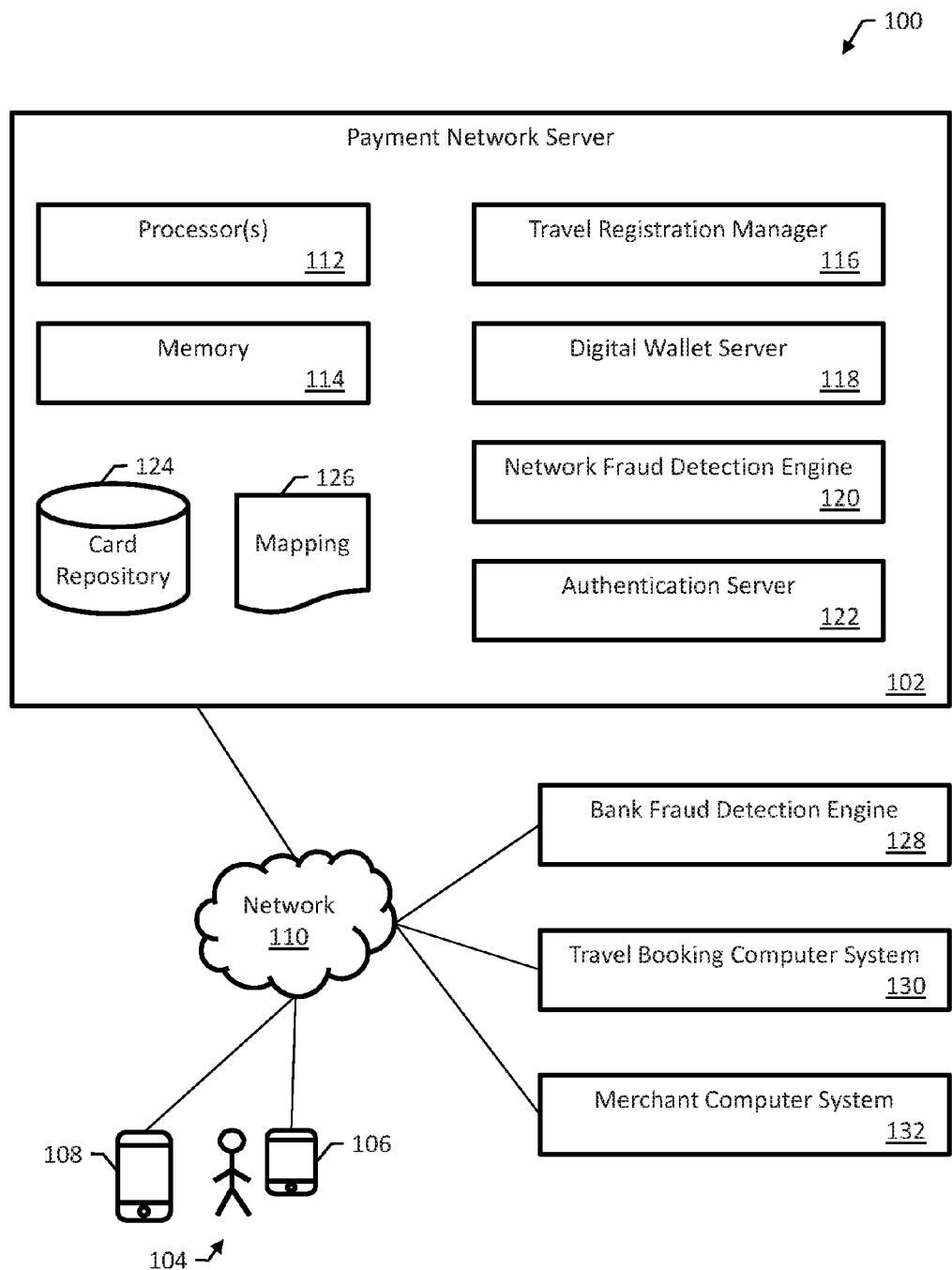
FIG. 1 is a block diagram of an example communications environment for consolidated registration of payment cards.

FIG. 1 is a block diagram of an example communications environment 100 for consolidated registration of payment cards. Environment 100 includes a payment network server 102 configured, by virtue of appropriate programming, for receiving requests from merchants, typically through a merchant acquirer or other appropriate entity depending on the card processing network, for authorization of payment card transactions against a payment card account of a customer.

In operation, payment network server 102 registers payment cards for travel for a user 104. Payment network server 102 can register both digital payment cards in digital wallets for user 104 and physical payment cards in a single interaction with user 104, which can reduce the processing load and networking load associated with registering multiple payment cards. Payment network server 102 can also simplify the technical aspects of the storage and transmission of protected data between computer systems. Furthermore, payment network server 102 can improve the user experience for user 104 by simplifying the process for registering multiple payment cards, which can also result in fewer declined transactions for users in general.

As illustrated in FIG. 1, user 104 is operating first and second user computer devices 106 and 108, which can be, for example, a mobile phone and a tablet computer. Environment 100 also includes a packet-based data communications network 110, e.g., the Internet. Environment 100 can include other computer systems that facilitate electronic payment transactions, including a bank fraud detection engine 128 executing on a system of one or more computers, a travel booking computer system 130, and a different merchant computer system.

Payment network server 102 can be a distributed computing system that includes one or more processors 112 and memory 114. Memory 114 stores instructions for processors 112 that can be loaded, e.g., into random access memory (RAM), and executed by processors 112 to cause processors 112 to perform operations for registering payment cards. Payment network server 102 implements, using processors 112 and memory 114, a travel registration manager 116, a digital wallet server 118, a network fraud detection engine 120, and an authentication server 122.

Travel registration manager 116 is configured for receiving, using packet-based data communications network 110, data specifying a geographic location and one or more dates of travel to the geographic location for a user. The data specifying the geographic location can include any appropriate type of data for specifying geographic locations, for example, zip codes; county, state, country names; and latitude and longitude or global positioning system (GPS) coordinates. The data specifying the dates typically specifies days of the year that the user is planning on travelling to the geographic location, but any appropriate type of data specifying a time or range of times can be used. Travel registration manager 116 is also configured to receive device specific information, e.g., device ID, for device or consumer identification.

Travel registration manager 116 is configured for receiving a selection of digital payment cards from a first digital wallet for user 104. For example, suppose that user computer device 106 hosts the first digital wallet for user 104. User 104 can use a graphical user interface (GUI) displayed on user computer device 106 to select some or all of the digital payment cards hosted on the first digital wallet. The GUI can be, e.g., a web site hosted by travel registration manager 116 and displayed in a web browser executing on user computer device 106. User computer device 106 transmits a message over packet-based data communications network 110 to travel registration manager 116 that specifies the selected digital payment cards and device ID.

Travel registration manager 116 is configured for registering, with a fraud detection engine executing on a computer system, the selected digital payment cards, mapped physical cards, devices (mobile phone or smart watch) for the user and the dates of travel to the geographic location. For example, the fraud detection engine can be network fraud detection engine 120, which executes on payment network server 102. In another example, travel registration manager 116 alternatively or additionally registers the selected digital payment cards with bank fraud detection engine 128. Registering the digital payment cards includes transmitting a message to the fraud detection engine, which in response accesses a database storing records for digital payment cards. The fraud detection engine can add, to a record for each of the digital payment cards, the data specifying the geographic location and the dates of travel to the geographic location or a reference to the data.

Fraud detection engine 120 can then use the registration in analyzing transactions to produce fraud scores. When fraud detection engine 120 receives data specifying a transaction, fraud detection engine 120 accesses the record in the database for the digital payment card used in the transaction. If the digital payment card, physical card or device has been registered and the transaction matches the date and geographic location of the registration, then fraud detection engine 120 modifies a risk score of the transaction, e.g., by reducing the risk score since the transaction is less likely to be fraudulent given that the user registered the digital payment card.

Travel registration manager 116 is configured to register multiple payment cards with fraud detection engine 120 in a single interaction with user 104. Registering multiple payment cards in a single interaction can be useful, e.g., for reducing the processing and networking overhead associated with multiple transactions on multiple computer systems, and for reducing the time it takes user 104 to register multiple payment cards on different computer systems. Registering multiple payment cards in a single interaction with the user improves the accuracy of fraud detection by fraud detection engine 120 and improves the user experience by reducing the likelihood of a legitimate transaction inadvertently being declined in an effort to reduce fraud.

Travel registration manager 116 can register multiple payment cards in a single interaction in a number of different ways. As described above, travel registration manager 116 can register multiple digital payment cards selected from a digital wallet for user 104, even where the multiple digital payment cards are issued from different banks or associated with different payment networks. In the case where some of the digital payment cards are associated with different banks and payment networks, travel registration manager 116 can access a database storing registration instructions. The database can be populated by a system administrator or by a bank or payment network using an application programming interface (API). Travel registration manager 116 registers, by executing appropriate software, with the different banks and payment networks using the registration instructions.

Travel registration manager 116 can optionally also register any other payment cards associated with the selected digital payment cards. For example, a digital payment card may be associated with a physical payment card by virtue of being associated with a common financial account for satisfying payments initiated with both the digital payment card and the physical payment card. When user 104 selects the digital payment card for registration, travel registration manager 116 uses a repository of payment card information 124 and a mapping 126 between digital payment cards and physical payment cards to determine that the digital payment card is associated with the physical payment card and automatically registers the physical payment card in additional to the digital payment card.

In another example, a first digital payment card in one digital wallet, e.g., a digital wallet on user computer device 106, may be associated with a second digital payment card in another digital wallet, e.g., a digital wallet on user computer device 108. The digital payment cards are associated by virtue of being associated with a common financial account for satisfying payments initiated with both the digital payment cards. When user 104 selects the digital payment card for registration, travel registration manager 116 uses repository 124 and mapping 126 to determine that the first digital payment card is associated with the second digital payment card and automatically registers the second digital payment card in additional to the first digital payment card.

In some examples, payment network server 102 has access to repository 124 and mapping 126 as a result of executing digital wallet server 118. Digital wallet server 118 provides services for user 104 to set up digital wallets. For example, digital wallet server 118 can provide a graphical user interface (GUI) to user computer device 106 for setting up digital wallets, e.g., by collecting personal and financial information from user 104. User computer device 106 can then execute a digital wallet client for hosting the digital wallet.

For example, user 104 may initially supply information specifying a physical payment card to digital wallet server 118 using user computer device 106. Digital wallet server 118 then generates a token, i.e., a unique sequence of letters or numbers or both, for the physical payment card and stores the token on user computer device 106 as the digital payment card. Digital wallet server 118 records data for both the physical and digital payment cards in card repository 124 and creates an electronic association between the physical payment card and the digital payment card in mapping 126.

User 104 may then later request a digital payment card associated with the same physical payment card from user device 108. Digital wallet server 118 generates a different token and stores the token on user computer device 108 as a different digital payment card associated with the same physical payment card. Digital wallet server 118 records data for the different digital payment card in card repository 124 and creates an electronic association for the different digital payment card in mapping 126. In the event that user 104 registers the digital payment card on either user computer device 106 or user computer device 108, travel registration manager 116 can automatically register both digital payment cards and the physical payment card. Travel registration manager 116 can send a message to the user computer device that was used for registration to display a notice to user 104 indicating that the other payment cards were also registered.

Authentication server 122 authenticates user 104 to some or all of the services in environment 100, e.g., travel registration manager 116 and digital wallet server 118. In general, authentication server 122 can use any appropriate techniques for authentication and other types of security to ensure protection of personal and financial data for user 104. User 104 can authenticate to authentication server 122, e.g., using biometric authorization on one or both of user devices 106 and 108, or by providing user credentials.

In some examples, payment network server 102 registers payment cards in connection with user 104 booking travel on travel booking computer system 130. For example, user 104 may use a web browser executing on user computer device 106 to load a web site hosted by travel booking computer system 130 for making travel reservations. User 104 can purchase a flight, book a hotel room, or a reserve a car using a digital payment card hosted on the digital wallet of user computer device 106. In connection with the travel booking, payment network server 102 registers multiple digital payment cards for the dates and locations of the travel. Payment network server 102 or user computer device 106 can determine the dates and locations of the travel by parsing text generated by travel booking computer system 130, e.g., a confirmation web page or e-mail.

Payment network server 102 may or may not coordinate with travel booking computer system 130 in registering digital payment cards in connection with travel booking. For example, travel booking computer system 130 can be configured to encourage users to register payment cards by presenting an option to register payment cards after booking travel, e.g., by displaying a hyperlink to payment network server 102 in a web page presented after the travel is booked, or by executing a script supplied by a system administrator of payment network server 102. In cases where travel booking computer system 130 is not configured to coordinate with payment network server 102, user 104 can still take actions to cause travel registration manager 116 to register payment cards after booking travel on travel booking computer system 130. For example, user 104 can use an e-mail client on user computer device 106 to forward a confirmation e-mail to an e-mail address monitored by travel registration manager 116.

In some examples, user 104 makes a purchase using merchant computer system 132 that is not explicitly travel-related but is nonetheless associated with future travel. For example, user 104 may purchase an event ticket for an event in a location that is different from a home location specified in a user profile for user 104, e.g., a user profile associated with a digital wallet. User 104 can still register payment cards using travel registration manager 116, e.g., by directing a web browser executing on user computer device 106 to a web site hosted by travel registration manager 116, or by executing a client app for travel registration manager 116 installed on user computer device 106.

Figure 2:
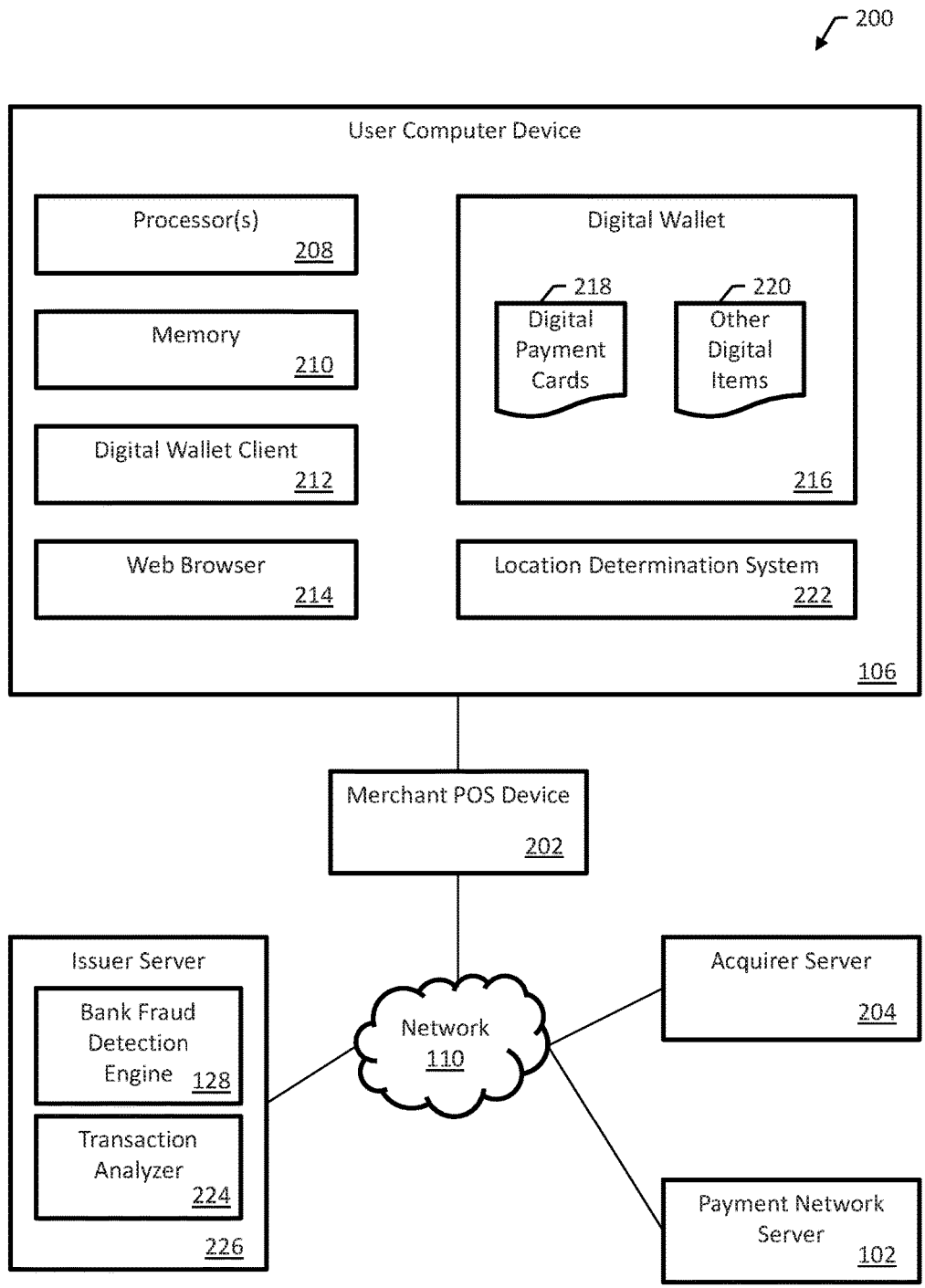
FIG. 2 is a block diagram of an example communications environment for initiation a transaction using a payment card registered for travel.

FIG. 2 is a block diagram of an example communications environment 100 for initiating a transaction using a payment card registered for travel. Environment 200 includes the payment network server 102, the user computer device 106, and the packet-based data communications network 110 of FIG. 1. Environment 200 also includes a merchant point-of-sale device 202, an acquirer server implemented on a system of one or more computers, and an issuer server 226 implemented on a system of one or more computers. In the depicted example, issuer server 226 executes the bank fraud detection engine 128 of FIG. 1.

User computer device 106 includes one or more processors 208 and memory 210. Memory 210 stores instructions for processors 208 that can be loaded, e.g., into random access memory (RAM), and executed by processors 208 to cause processors 208 to perform operations for initiating a transaction using a payment card registered for travel. User computer device 106 typically includes a display and a user input device, e.g., a touchscreen.

User computer device 106 implements, using processors 208 and memory 210, a digital wallet client 212, a web browser 214, and a digital wallet 216. User computer device 106 also includes a location determination system 222, which can be a global positioning system (GPS) receiver, a cellular or wi-fi network location determination system, or any appropriate combination of hardware and software for determining a geographic location of user computer device 106.

Digital wallet client 212 can interact with a digital wallet server, e.g., the digital wallet server 118 of FIG. 1, to host digital wallet 216 on user computer device 106. Hosting digital wallet 216 includes storing data such as tokens corresponding to digital payment cards 218 and other digital items 220 such as digital coupons, digital tickets, and electronic boarding passes for flights. Hosting digital wallet 216 also includes providing an interface for a user to initiate transactions using digital payment cards 218.

For example, digital wallet client 212 can present a GUI on a display screen of user computer device 106 for a user to view items stored in digital wallet 216 and for the user to add and delete items from digital wallet 216, e.g., by interacting with digital wallet server 118 over packet-based data communications network 110. The user may alternatively or additionally access information regarding digital wallet 216 using web browser 214, e.g., by loading a web page hosted by digital wallet server 118. The user can initiate the transaction, e.g., by bringing user computer device 106 to within an appropriate distance of merchant POS device 202, causing user computer device 106 and merchant POS device 202 to establish a near-field communication (NFC) session. During the NFC communications session, user computer device 106 can transmit, e.g., a token or other appropriate data representing one of digital payment cards 218 and optionally data from location determination system 222.

Merchant POS device 202 then exchanges messages with payment network server 102 for authorization of the transaction. Payment network server 102 exchanges messages, as appropriate depending on the structure of the payment network, with acquirer server 204 and issuer server 226 to determine whether or not to authorize the transaction. Payment network server 102 may use the network fraud detection engine 120 of FIG. 1 to determine whether or not to decline the transaction for exceeding a threshold risk score indicating fraud. The fraud detection engine 120 of FIG. 1 may alternatively produce a fraud score for the transaction for the issuer (consumer's bank) to decide whether to approve or decline the transaction. Alternatively or additionally, issuer server may use bank fraud detection engine 128 to whether or not to decline the transaction for exceeding a threshold risk score indicating fraud.

In either case, the system modifies a risk score (likely reducing the score) if the digital payment card used was registered for travel and the date and geographic location of the transaction match the dates and geographic location of the registration. The system can determine that the geographic location matches the registration, for example, using data from location determination system 222 or data from merchant POS device 202 or both. Issuer server 226 implements a transaction analyzer 224 configured to ultimately determine to authorize the transaction based on the risk score and other data, e.g., whether there are sufficient funds or credit for the account associated with the digital payment card to satisfy the amount of the transaction.

Figure 3A:
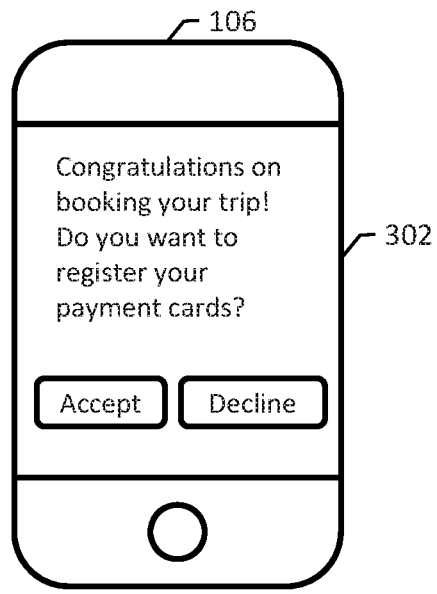
FIGS. 3A-B are screen shots illustrating a user registering payment cards for travel.
Figure 3B:
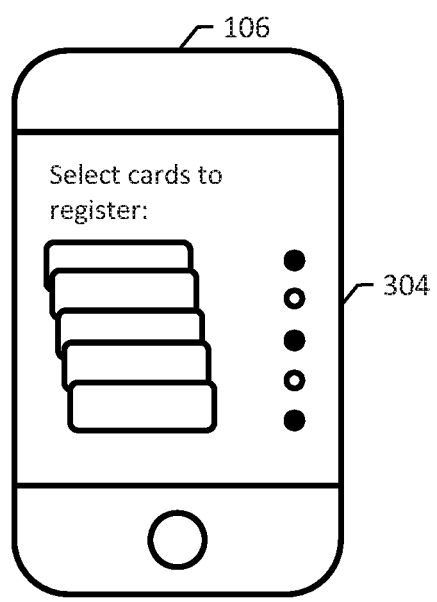

FIGS. 3A-B are line drawings of computer screen shots that may be displayed on user device 106 for registering payment cards for travel. The user can be the user 104 of FIG. 1 registering payment cards on user computer device 106 by exchanging messages with travel registration manager 116 over packet-based data communications network 110.

In FIG. 3A, screen shot 302 shows a prompt of a GUI for a user to initiate registration of payment cards. For example, user device 106 can be configured, by virtue of appropriate programming, to present screen shot 302 after user 104 books travel on the travel booking computer system 130 of FIG. 1. In FIG. 3B, screen shot 304 shows an interface for selecting digital payment cards from a digital wallet for registration. For example, digital wallet client 212 of FIG. 2 can determine to display some or all of digital payment cards 218 of FIG. 2.

After user 104 selects some or all of the digital payment cards, user computer device 106 transmits a message to travel registration manager 116 specifying the selected digital payment cards, causing travel registration manager 116 to register the digital payment cards. For example, if user 104 has just booked travel on the travel booking computer system 130 of FIG. 1, user computer device 106 can transmit a message to travel registration manager 116 specifying the dates and geographic locations of the booked travel.

In one exemplary implementation, the computer screen shots illustrated in FIGS. 3A and 3B and the automatic payment card steps triggered through user interaction with the user interfaces may be implemented by digital wallet client 212 illustrated in FIG. 1. In an alternate implementation, user device 106 may be provided with a payment card registration application that displays the computer screen shots illustrated in FIGS. 3A and 3B and preforms the steps described herein for automatic payment card registration.

Figure 4:
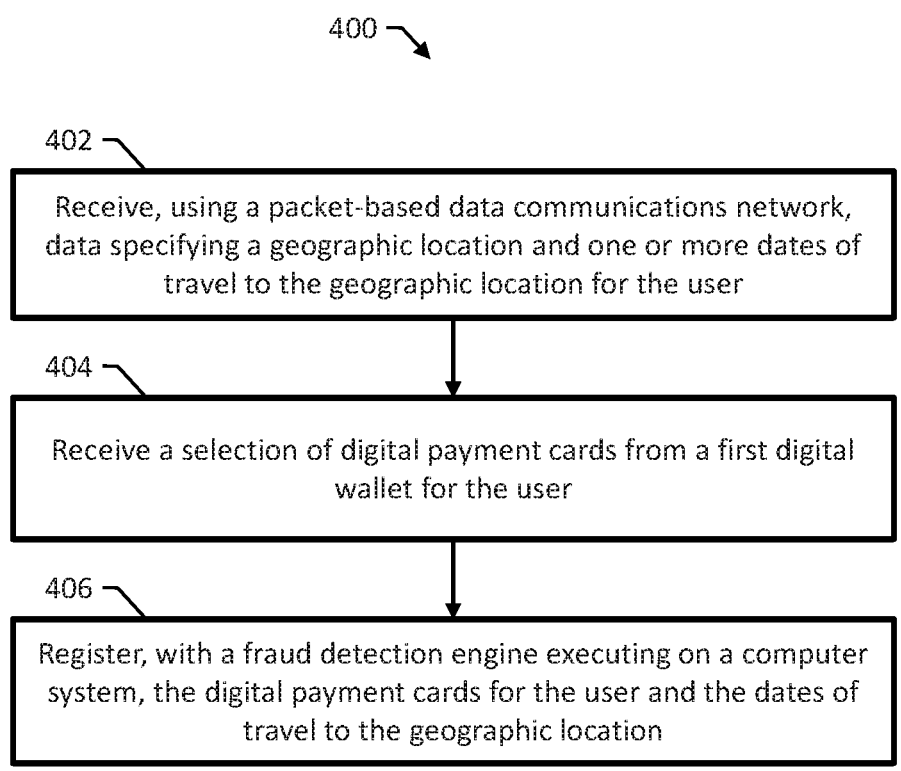
FIG. 4 is a flow chart of an example method for consolidated registration of payment cards.

FIG. 4 is a flow chart of an example method 400 for consolidated registration of payment cards. Method 400 is performed by a system of one or more computers configured, by virtue of appropriate programming, to register digital payment cards for travel with a fraud detection engine. For example, the travel registration manager 116 of FIG. 1 can perform method 400.

The system receives, using a packet-based data communications network, data specifying a geographic location and one or more dates of travel to the geographic location for a user (402). For example, receiving the data specifying the geographic location and the dates of travel to the geographic location can include parsing text data generated as a result of the user booking one or more travel-related reservations using one of the digital payment cards in the first digital wallet. The system receives a selection of digital payment cards from a first digital wallet for the user (404).

The system registers, with a fraud detection engine executing on a computer system, the digital payment cards for the user, the associated mobile devices and the dates of travel to the geographic location (406). Registering the digital payment cards causes the fraud detection engine to modify a risk score of at least a first transaction initiated by the user during the dates of travel and within a threshold geographic distance of the geographic location. Causing the fraud detection engine to modify the risk score for the first transaction initiated by the user can cause the fraud detection engine to reduce the risk score as a result of registering the digital payment cards.

For example, suppose that the user initiates the first transaction using a first digital payment card in the first digital wallet. The first digital payment card is associated with a financial account at an issuer bank for satisfying payments initiated with the first digital payment card. Causing the fraud detection engine to reduce the risk score the first transaction initiated by the user can cause an issuer computer system for the issuer bank to approve the first transaction initiated by the user.

In some examples, a first digital payment card in the selection is issued by a first bank and a second digital payment card in the selection is issued by a second bank. In those situations, registering the digital payment cards includes registering the first digital payment card with a first fraud detection engine executing on a first computer system for the first bank and registering the second digital payment card with a second fraud detection engine executing on a second computer system for the second bank.

In some examples, registering the digital payment cards includes determining, using a mapping between digital payment cards and physical payment cards, that a first digital payment card of the first digital wallet is associated with a first physical payment card by virtue of being associated with a common financial account for satisfying payments initiated with both the first digital payment card and the first physical payment card. In those situations, registering the digital payment cards includes registering both the first digital payment card and the first physical payment card with the fraud detection engine.

The system may also determine that the first digital payment card of the first digital wallet is associated with a second digital payment card of a second digital wallet for the user by determining that the second digital payment card is also associated with the common financial account for satisfying payments initiated with both the first digital payment card and the second digital payment card. In those situations, registering the digital payment cards includes registering both the first digital payment card and the second digital payment card with the fraud detection engine. For example, the first digital wallet can be hosted on a first computer device for the user and the second digital wallet can be hosted on a second computer device for the user, and the first and second computer devices each include a processor and memory storing instructions for initiating payment transactions using digital wallets.

Figure 5:
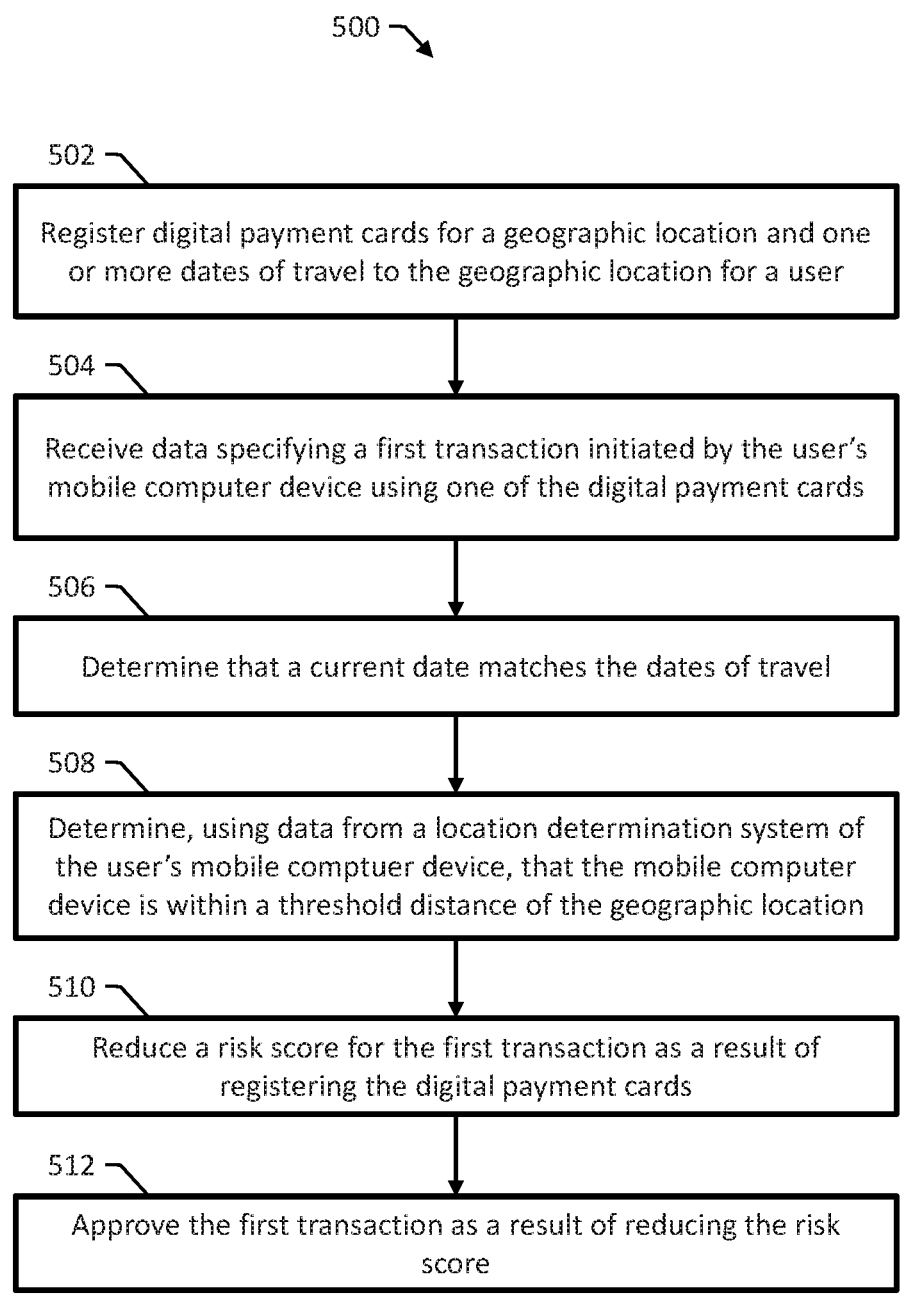
FIG. 5 is a flow chart of an example method illustrating a first transaction approved as a result of registering digital payment cards.

FIG. 5 is a flow chart of an example method 500 illustrating a first transaction approved as a result of registering digital payment cards. Method 500 is performed by a system of one or more computers configured, by virtue of appropriate programming, to analyze and approve or deny transactions initiated using payment cards. For example, the issuer server 226 of FIG. 2 can perform method 500.

The system registers a user's digital payment cards for a geographic location and one or more dates of travel to the geographic location for the user (502). The system receives data specifying a first transaction initiated by the user's mobile computer device using one of the digital payment cards stored in a digital wallet hosted on the user's mobile computer device (504). The system determines that a current date matches the dates of travel (506). The system determines, using data from a location determination system of the user's mobile computer device, that the mobile computer device is within a threshold distance of the geographic location (508).

The system reduces a risk score for the first transaction as a result of registering the digital payment cards, i.e., the risk score is lower than it would have been absent registration of the digital payment cards (510). The system approves the first transaction as a result of reducing the risk score (512).

The subject matter described herein improves the functionality of user device 106, payment network server 102, issuer server 226 and network 110 by automatically registering multiple payment cards without requiring the user to manually enter payment card numbers (e.g., PAN numbers) or provide such information via a telephone call. In addition, by automatically registering multiple cards in a single interaction with a user, the number of messages traveling across network 110 is reduced over the case where the user initiates a separate registration transaction (e.g., by telephone) for each payment card. The subject matter described herein also improves the technological field of payment card transaction security. Automatically transmitting stored payment card numbers to payment network server 102 for travel registration along with travel location information, improves the accuracy of payment card verification by payment network server 102. In addition, the likelihood of payment card information being overheard by someone in close proximity to the user is reduced over manual payment card travel registration.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for consolidated registration of payment cards, the method comprising:
receiving, by a travel registration manager implemented on at least one processor, data specifying a geographic location and one or more dates of travel to the geographic location for a user;
receiving, by the travel registration manager, a selection of a plurality of digital payment cards from a first digital wallet for the user; and
registering, by the travel registration manager and with a fraud detection engine executing on a computer system, the plurality of digital payment cards for the user and the dates of travel to the geographic location, causing the fraud detection engine to modify a risk score of at least a first transaction initiated by the user during the dates of travel and within a threshold geographic distance of the geographic location,
wherein registering the plurality of digital payment cards comprises determining, using a mapping between digital payment cards and physical payment cards, that a first digital payment card of the first digital wallet is associated with a first physical payment card by virtue of being associated with a common financial account for satisfying payments initiated with both the first digital payment card and the first physical payment card, and wherein registering the plurality of digital payment cards comprises registering both the first digital payment card and the first physical payment card with the fraud detection engine,
wherein registering the plurality of digital payment cards comprises determining that the first digital payment card of the first digital wallet is associated with a second digital payment card of a second digital wallet for the user by determining that the second digital payment card is also associated with the common financial account for satisfying payments initiated with both the first digital payment card and the second digital payment card, and wherein registering the plurality of digital payment cards comprises registering both the first digital payment card and the second digital payment card with the fraud detection engine, and
wherein the first digital wallet is hosted on a first computer device for the user and the second digital wallet is hosted on a second computer device for the user, and wherein the first and second computer devices each comprise a processor and memory storing instructions for initiating payment transactions using digital wallets.

2. The method of claim 1, wherein the plurality of digital payment cards includes a first digital payment card issued by a first bank and a second digital payment card issued by a second bank, and wherein registering the plurality of digital payment cards includes registering the first digital payment card with a first fraud detection engine executing on a first computer system for the first bank and registering the second digital payment card with a second fraud detection engine executing on a second computer system for the second bank.

3. The method of claim 1, wherein determining that the first digital payment card of the first digital wallet is associated with the first physical payment card comprises determining that the first digital payment card of the first digital wallet is associated with the first physical payment card in response to receiving a user selection of the first digital payment card for registration with the fraud detection engine.

4. The method of claim 1, wherein the first digital wallet is hosted on a mobile computer device for the user and the mobile computer device comprises a location determination system, and wherein the method comprises, at the fraud detection engine:
 receiving data specifying the first transaction initiated by the user;
 determining that a current date matches the dates of travel; and
 determining, using data from the location determination system of the mobile computer device, that the mobile computer device is within the threshold geographic distance of the geographic location.

5. The method of claim 4, wherein receiving data specifying the first transaction initiated by the user comprises receiving the data specifying the first transaction initiated by the user from a merchant point of sale (POS) device and receiving additional data indicating that the merchant POS device has interacted with the mobile computer device and verified a geographic location reported by the location determination system of the mobile computer device.

6. The method of claim 1, wherein causing the fraud detection engine to modify the risk score for the first transaction initiated by the user comprises causing the fraud detection engine to reduce the risk score as a result of registering the plurality of digital payment cards.

7. The method of claim 6, wherein the user initiates the first transaction using a first digital payment card in the first digital wallet, and wherein the first digital payment card is associated with a financial account at an issuer bank for satisfying payments initiated with the first digital payment card, and wherein causing the fraud detection engine to reduce the risk score the first transaction initiated by the user comprises causing an issuer computer system for the issuer bank to approve the first transaction initiated by the user.

8. The method of claim 1, wherein receiving the data specifying the geographic location and the dates of travel to the geographic location comprises parsing text data generated as a result of the user booking one or more travel-related reservations using one of the digital payment cards in the first digital wallet.

9. A system comprising:
 at least one processor; and
 a travel registration manager implemented on the at least one processor and configured for consolidated registration of payment cards by:
  receiving data specifying a geographic location and one or more dates of travel to the geographic location for a user;
  receiving a selection of a plurality of digital payment cards from a first digital wallet for the user; and
  registering, with a fraud detection engine executing on a computer system, the plurality of digital payment cards for the user and the dates of travel to the geographic location, causing the fraud detection engine to modify a risk score of at least a first transaction initiated by the user during the dates of travel and within a threshold geographic distance of the geographic location,
 wherein registering the plurality of digital payment cards comprises determining, using a mapping between digital payment cards and physical payment cards, that a first digital payment card of the first digital wallet is associated with a first physical payment card by virtue of being associated with a common financial account for satisfying payments initiated with both the first digital payment card and the first physical payment card, and wherein registering the plurality of digital payment cards comprises registering both the first digital payment card and the first physical payment card with the fraud detection engine,
 wherein registering the plurality of digital payment cards comprises determining that the first digital payment card of the first digital wallet is associated with a second digital payment card of a second digital wallet for the user by determining that the second digital payment card is also associated with the common financial account for satisfying payments initiated with both the first digital payment card and the second digital payment card, and wherein registering the plurality of digital payment cards comprises registering both the first digital payment card and the second digital payment card with the fraud detection engine, and
 wherein the first digital wallet is hosted on a first computer device for the user and the second digital wallet is hosted on a second computer device for the user, and wherein the first and second computer devices each comprise a processor and memory storing instructions for initiating payment transactions using digital wallets.

10. The system of claim 9, wherein the plurality of digital payment cards includes a first digital payment card issued by a first bank and a second digital payment card issued by a second bank, and wherein registering the plurality of digital payment cards includes registering the first digital payment card with a first fraud detection engine executing on a first computer system for the first bank and registering the second digital payment card with a second fraud detection engine executing on a second computer system for the second bank.

11. The system of claim 9, wherein determining that the first digital payment card of the first digital wallet is associated with the first physical payment card comprises determining that the first digital payment card of the first digital wallet is associated with the first physical payment card in response to receiving a user selection of the first digital payment card for registration with the fraud detection engine.

12. The system of claim 9, wherein the first digital wallet is hosted on a mobile computer device for the user and the mobile computer device comprises a location determination system, and wherein the system comprises the fraud detection engine and the fraud detection engine is configured for:
 receiving data specifying the first transaction initiated by the user;
 determining that a current date matches the dates of travel; and
 determining, using data from the location determination system of the mobile computer device, that the mobile computer device is within the threshold geographic distance of the geographic location.

13. The system of claim 12, wherein receiving data specifying the first transaction initiated by the user comprises receiving the data specifying the first transaction initiated by the user from a merchant point of sale (POS) device and receiving additional data indicating that the merchant POS device has interacted with the mobile computer device and verified a geographic location reported by the location determination system of the mobile computer device.

14. The system of claim 9, wherein causing the fraud detection engine to modify the risk score for the first transaction initiated by the user comprises causing the fraud detection engine to reduce the risk score as a result of registering the plurality of digital payment cards.

15. The system of claim 14, wherein the user initiates the first transaction using a first digital payment card in the first digital wallet, and wherein the first digital payment card is associated with a financial account at an issuer bank for satisfying payments initiated with the first digital payment card, and wherein causing the fraud detection engine to reduce the risk score the first transaction initiated by the user comprises causing an issuer computer system for the issuer bank to approve the first transaction initiated by the user.

16. The system of claim 9, wherein receiving the data specifying the geographic location and the dates of travel to the geographic location comprises parsing text data generated as a result of the user booking one or more travel-related reservations using one of the digital payment cards in the first digital wallet.

17. One or more non-transitory computer readable media storing instructions for at least one processor that, when executed by the at least one processor, cause the at least one processor to consolidate registration of payment cards by performing operations comprising:
receiving data specifying a geographic location and one or more dates of travel to the geographic location for a user;
receiving a selection of a plurality of digital payment cards from a first digital wallet for the user; and
registering, with a fraud detection engine executing on a computer system, the plurality of digital payment cards for the user and the dates of travel to the geographic location, causing the fraud detection engine to modify a risk score of at least a first transaction initiated by the user during the dates of travel and within a threshold geographic distance of the geographic location,
wherein registering the plurality of digital payment cards comprises determining, using a mapping between digital payment cards and physical payment cards, that a first digital payment card of the first digital wallet is associated with a first physical payment card by virtue of being associated with a common financial account for satisfying payments initiated with both the first digital payment card and the first physical payment card, and wherein registering the plurality of digital payment cards comprises registering both the first digital payment card and the first physical payment card with the fraud detection engine,
wherein registering the plurality of digital payment cards comprises determining that the first digital payment card of the first digital wallet is associated with a second digital payment card of a second digital wallet for the user by determining that the second digital payment card is also associated with the common financial account for satisfying payments initiated with both the first digital payment card and the second digital payment card, and wherein registering the plurality of digital payment cards comprises registering both the first digital payment card and the second digital payment card with the fraud detection engine, and
wherein the first digital wallet is hosted on a first computer device for the user and the second digital wallet is hosted on a second computer device for the user, and wherein the first and second computer devices each comprise a processor and memory storing instructions for initiating payment transactions using digital wallets.

* * * * *